United States Patent [19]
Ando et al.

[11] Patent Number: 6,079,274
[45] Date of Patent: Jun. 27, 2000

[54] VIBRATION WAVE DETECTING METHOD AND VIBRATION WAVE DETECTOR

[75] Inventors: Shigeru Ando, Chiba; Muneo Harada, Osaka, both of Japan

[73] Assignee: Sumitomo Metal Industries Limited, Osaka, Japan

[21] Appl. No.: 09/316,586

[22] Filed: May 21, 1999

[30] Foreign Application Priority Data

May 22, 1998 [JP] Japan .................................. 10-141915
Apr. 30, 1999 [JP] Japan .................................. 11-125303

[51] Int. Cl.[7] .................................................. G01H 11/00
[52] U.S. Cl. ............................................. 73/649; 310/321
[58] Field of Search .................... 73/651, 649; 310/321, 310/322, 334

[56] References Cited

U.S. PATENT DOCUMENTS 3,614,678  10/1971  Engeler et al. ........................... 333/72
5,856,722  1/1999  Haronian et al. ....................... 310/321

*Primary Examiner*—Richard A. Moller
*Attorney, Agent, or Firm*—Barnes & Thornburg

[57] ABSTRACT

A vibration wave detector in which: a plurality of resonator beams, each having a different length and being allowed to resonate at a specific frequency, are provided; a piezoresistor is installed in each resonator beam; and the piezoresistors are parallel-connected so that vibration is converted to an electric signal by the piezoresistors so as to output the sum of vibration waveforms at the respective resonator beams. It is possible to control a gain of a specific frequency band by changing a voltage to be applied to the parallel circuit or changing the resistance value of each piezoresistor.

27 Claims, 21 Drawing Sheets

(4 kΩ)

(2 kΩ)

VIBRATION WAVE DETECTING METHOD AND VIBRATION WAVE DETECTOR

BACKGROUND OF THE INVENTION

Vibration sensors of a resonator array type have been proposed in which: a plurality of resonators having different lengths (that is, different resonant frequencies) are arranged in the form of an array, and allowed to resonate selectively in response to a vibration wave such as a sound wave with specific frequencies for the respective resonators, and the resonance levels of the respective resonators are converted to electric signals so that intensities of the vibration wave for respective frequency bands are detected. (For examples W. Benecke et al., "A Frequency-Selective, Piezoresistive Silicon Vibration Sensor," Digest of Technical Papers of TRANSDUCERS '85, pp. 105–108 (1985), or E. Peeters et al., "Vibrarion Signature Analysis Sensors for Predictive Diagnostics," Proceedings of SPIE '97, vol. 3224, pp-220–230 (1997)).

BRIEF SUMMARY OF THE INVENTION

In a conventional vibration sensor, a piezoresistor is formed at the base of a resonator, and changes in the resistance value of the piezoresistor, which occur due to vibrations resonance) of the resonator, are detected by a Wheatstone bridge, etc. so that an electric output signal is taken out of the resonator. In particular, in the sensor disclosed in the latter document, the output signal is obtained while the Wheatstone bridge output from each resonator is being switched by a multiplexer In the vibration sensor of this type, there is a demand for controlling the gain (detection sensitivity) of a specific frequency band of an inputted vibration wave. In a conventional vibration sensor. in order to obtain such a detection sensitivity controlling function, it is necessary to provide a circuit construction which can subject the electric output signal obtained from each resonator to an amplifying process or a damping process at a succeeding step. This results in a problem of a large circuit scale as a whole.

In accordance with the present invention, it becomes possible to provide a vibration wave detecting method and a vibration wave detector which enable the detection sensitivity controlling function by using a simple circuit construction.

Referring to one example of the present invention, the following description will briefly discuss the principle of the present invention. In the present invention, plurality of resonatore having respectively different resonant frequencies are arranged in the form of an array. In response to an inputted vibration wave, the respective resonators selectively react with resonant frequencies that the resonators own so as to detect the intensities of the respective frequency components in the vibration wave. Piezoresistors axe formed in the respective resonators, and these piezoresistors are connected in parallel so that the sum of the vibration waveforms of the respective resonators is outputted. Here, it is possible to set a detection gain for each resonator by changing the shape of each piezoresistor so as to vary the resistance value thereof or by adjusting the voltage to be applied to the parallel circuit. In this manner, since the output gain of each resonator is freely adjusted easily without the necessity of an amplifier at the succeeding step, it becomes possible to obtain a desired frequency characteristic, and consequently to achieve a vibration wave sensor having a detection sensitivity controlling function by using a simpler construction as compared with the conventional sensor.

With another example of the present invention in which a plurality of resonators having the same resonant frequency are installed, it becomes possible to obtain a large electric output, and also to prevent a detection error.

Moreover, by changing the size of the piezoresistor of each resonator or forming a slit in the piezoresistor, it is possible to allow each piezoresistor to have a variable resistance value; thus, the gain adjustment for the electric output of each resonator can be carried out easily.

Furthermore, in an arrangement in which a bottleneck portion of each piezoresistor is formed so that a current flowing through the bottleneck portion has a direction substantially orthogonal to the direction of strain, since the specific resistivity at the bottleneck portion is not changed by the strain, it is possible to substantially change both the length and the width of the piezoresistor by using the bottleneck portion.

Moreover, the piezoresistors of the respective resonators are parallel connected and a voltage is applied to one end of the parallel circuit so as to take out the sum of the electric outputs of the respective resonators from the other end of the parallel circuit; thus, it is possible to simplify line connections.

Furthermore, the gains of electric outputs of the respective resonators are adjusted by applying different voltages to the piezoresistors of the respective resonators, thus, it becomes possible to easily carry out the gain adjustment.

Moreover, all the resonators are divided into blocks, each consisting of a plurality of resonators, and piezoresistors are parallel-connected within each of the blocks with a different voltage being applied to the piezoresistors in the parallel circuit for each block; therefore, it is possible to obtain a different electric output from each block. In this case, when an arrangement is made to take out the sum of the electric outputs of the respective blocks, the line connections can be further simplified.

Furthermore, when a sound wave is used as the vibration wave to be detected, it is possible to realize an acoustic sensor having a detection sensitivity controlling function.

The above and further objects and features of the invention will more fully be apparent from the following detailed description with accompanying drawings.

FIGS, 7A and 7B are drawings that show one example of a change in the resistance value of a piezoresistor in the vibration wave detector of the present invention.

FIGS. 8A through 8D are drawings that show another example of a change in the resistance value of a piezoresistor in the vibration wave detector of the present invention.

Figure 9:
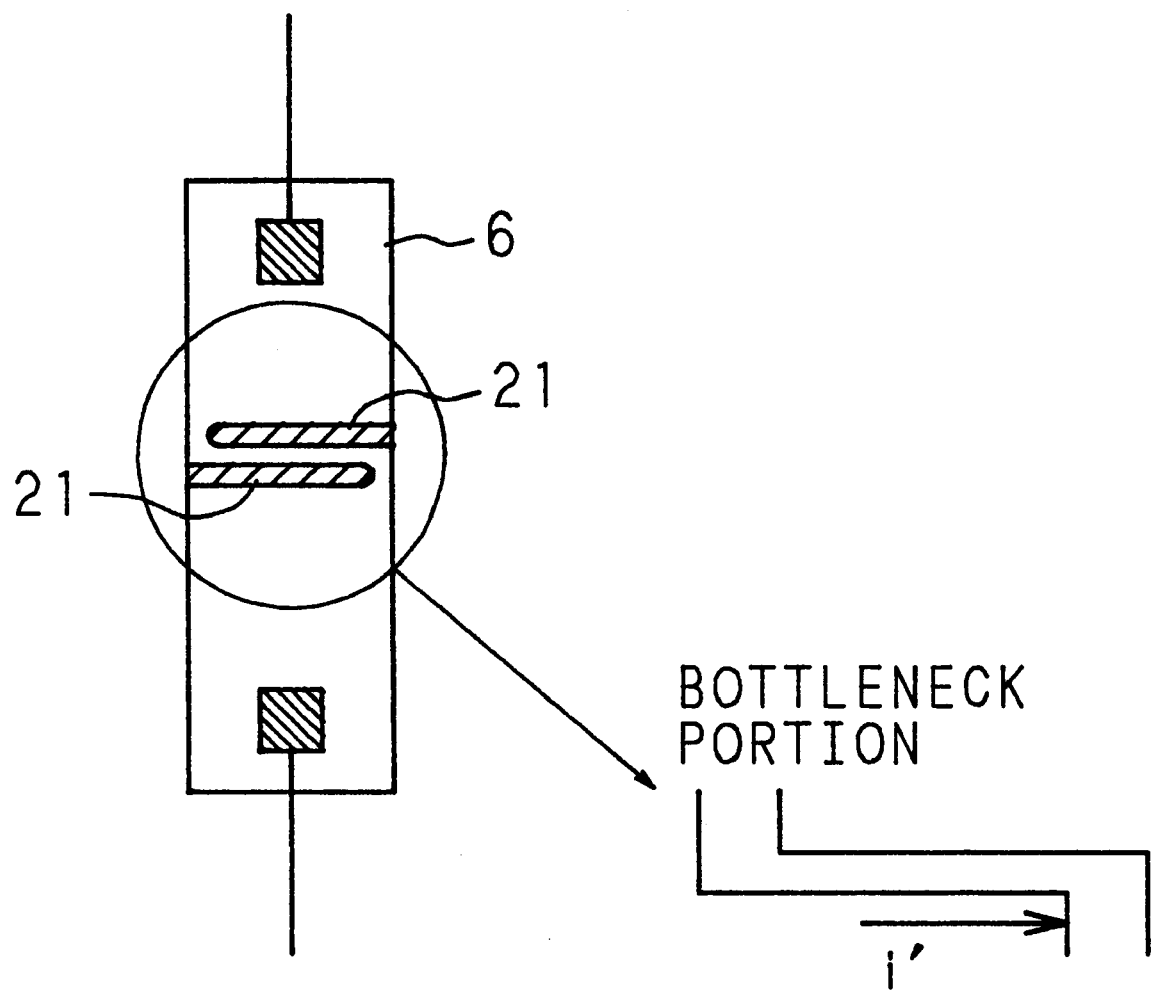

FIG. 9 is a drawing that shows the other example of a change in the resistance value of a piezoresistor in the vibration wave detector of the present invention.

Figure 10:
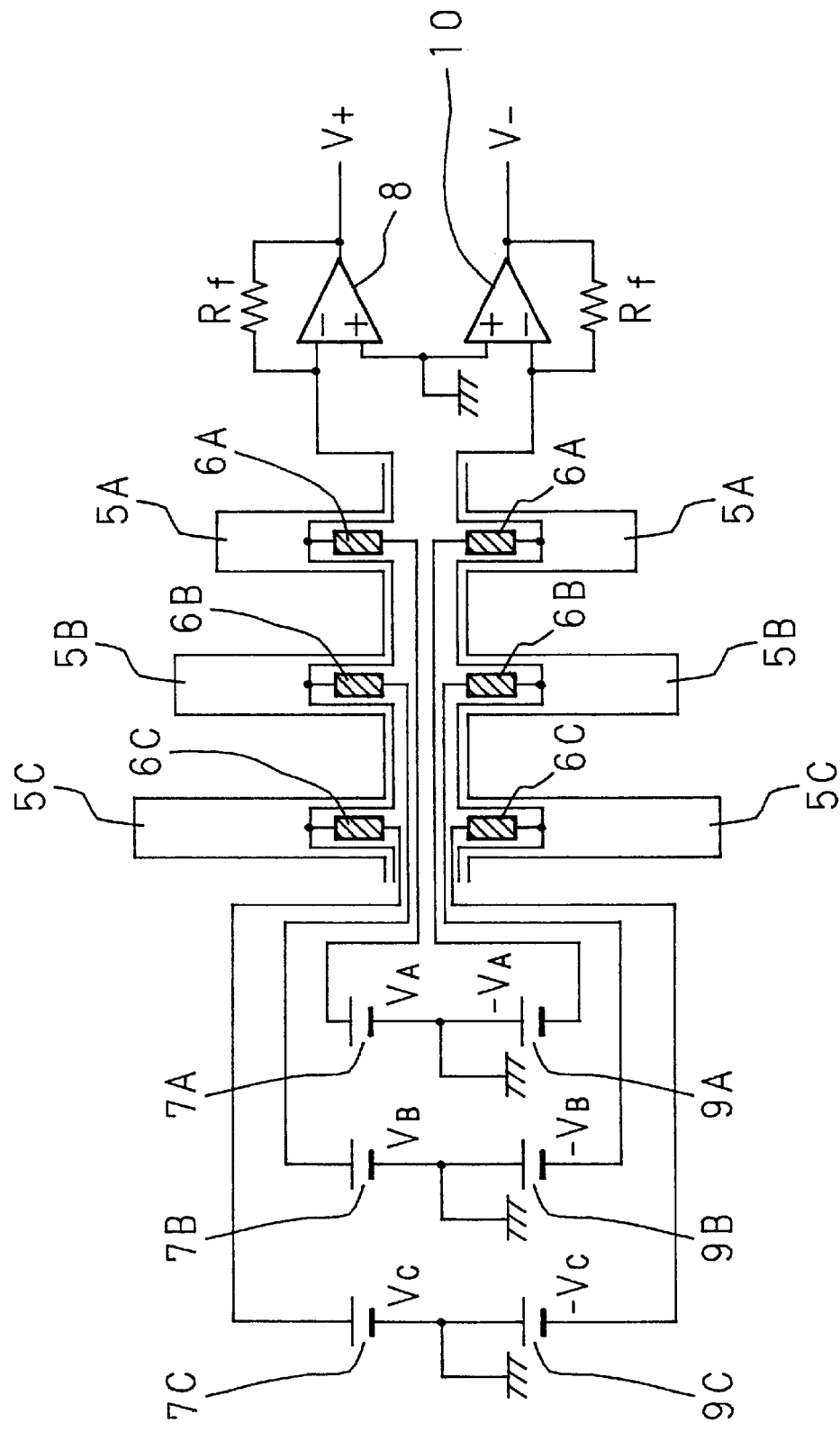

FIG. 10 is a circuit diagram that shows still another example of the vibration wave detector of the present invention.

Figure 11:
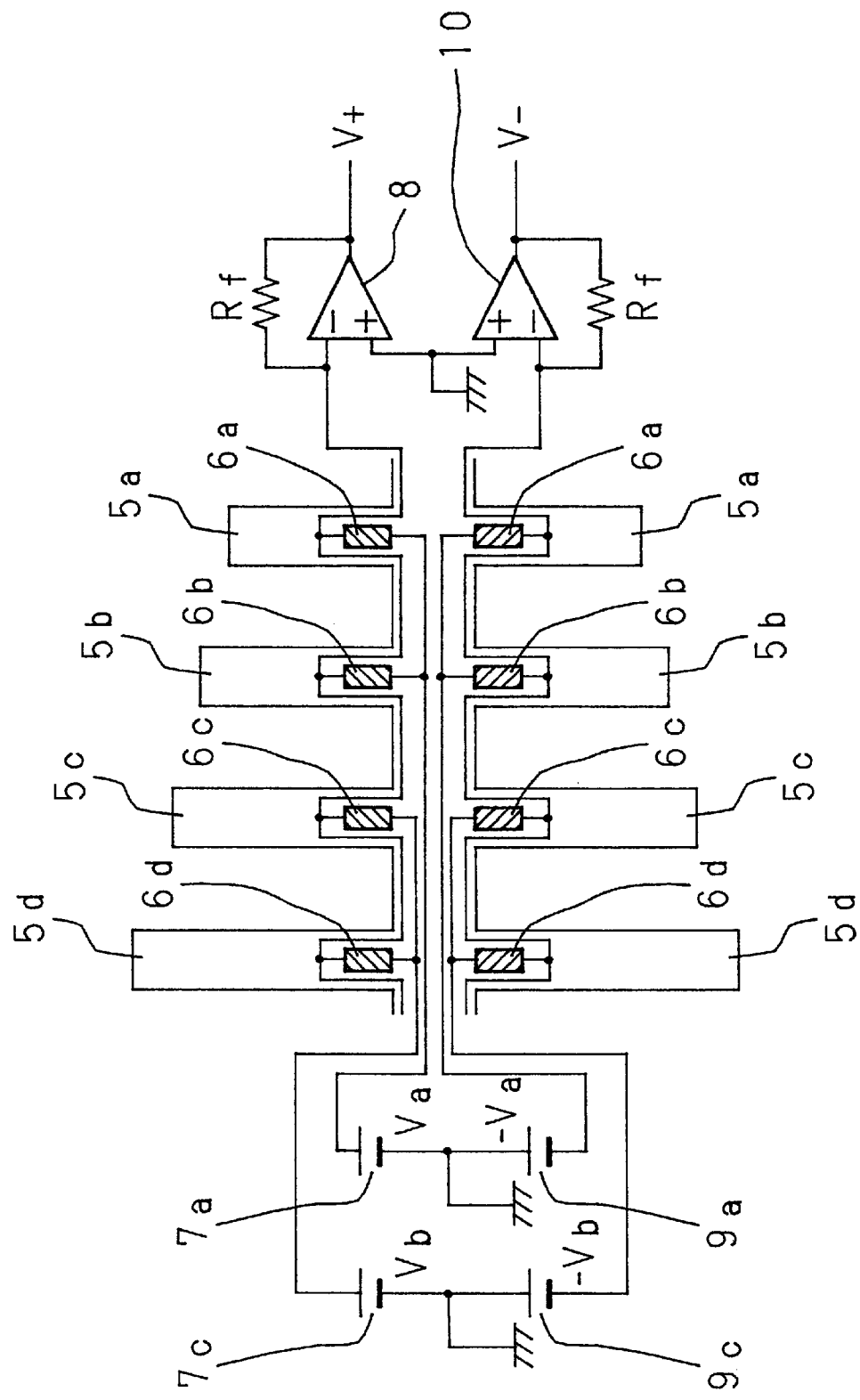

FIG. 11 is a circuit diagram that shows the other example of the vibration wave detector of the present invention.

Figure 12:
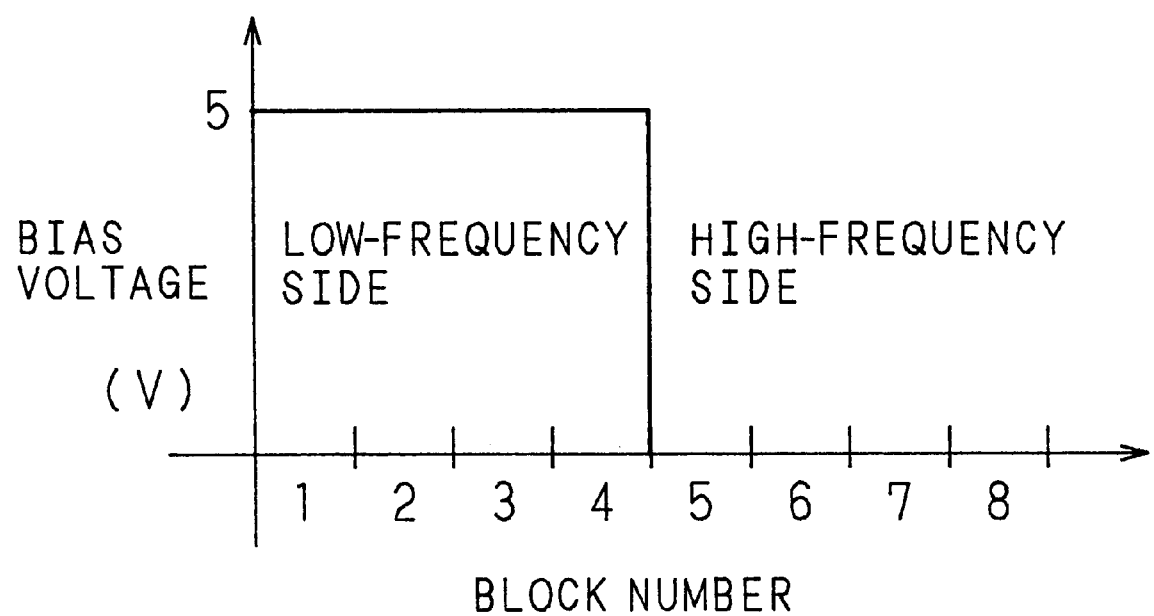

FIG. 12 is a graph that shows an example of a bias voltage pattern to be applied to resonator beams in the vibration wave detector of the present invention.

Figure 13:
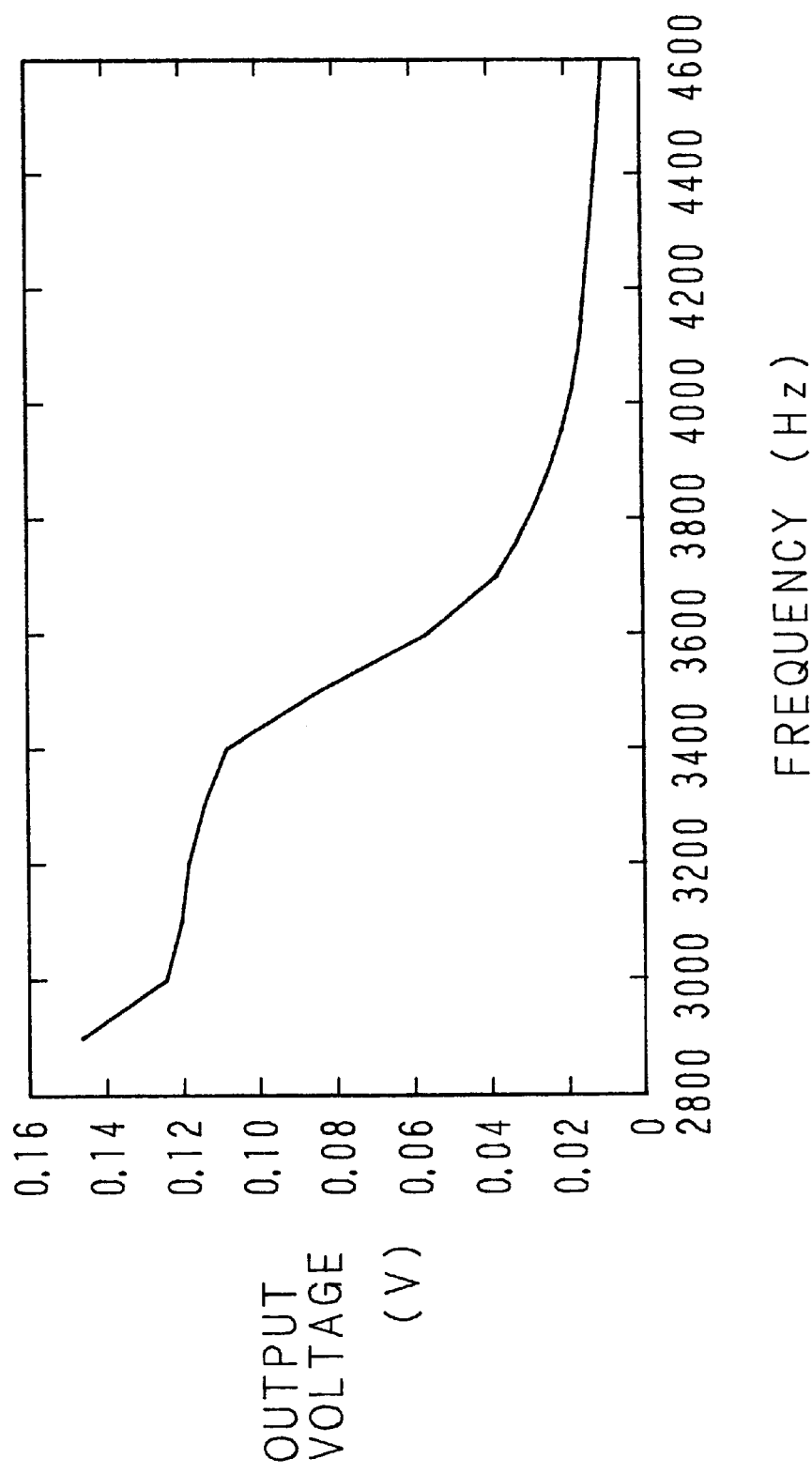

FIG. 13 is a graph that shows the results of simulation on the frequency and the amplitude of a variant voltage in the vibration wave detector of the present invention.

Figure 14:
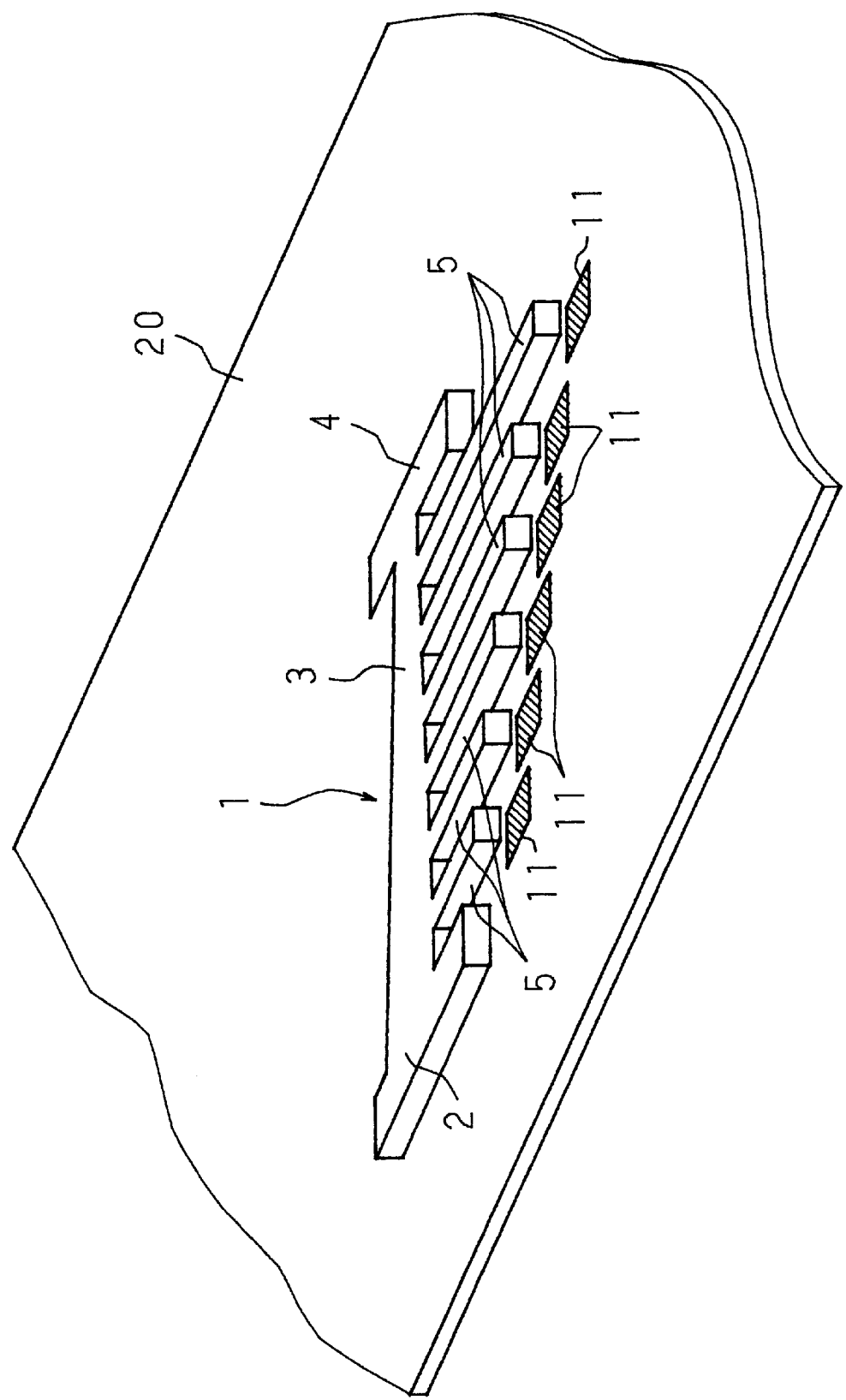

FIG. 14 is a perspective view that shows still another example of the vibration wave detector of the present invention.

Figure 15:
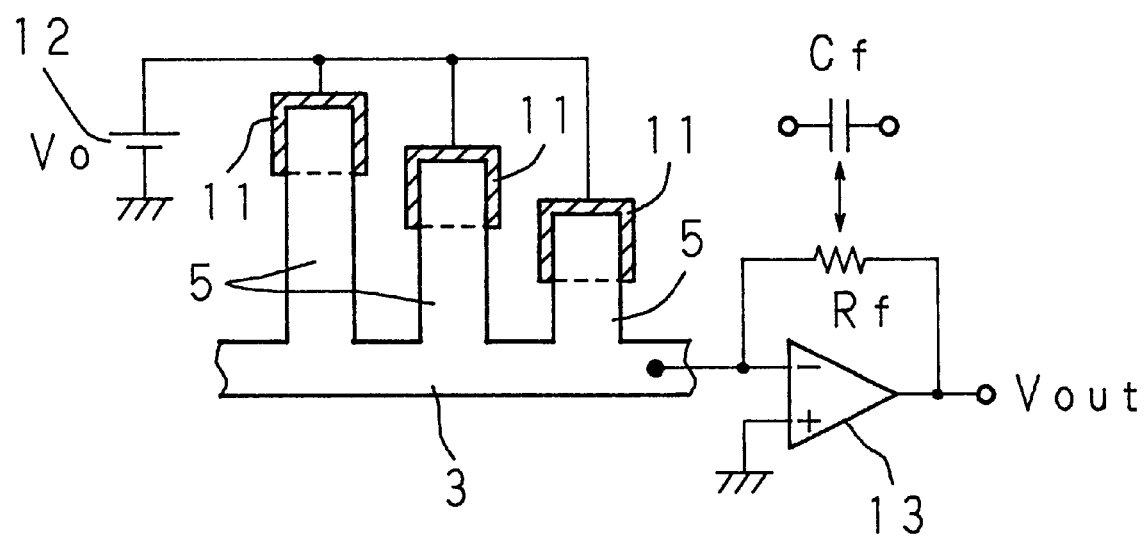

FIG. 15 is a circuit diagram that shows the other example of the vibration wave detector of the present invention.

Figure 16:
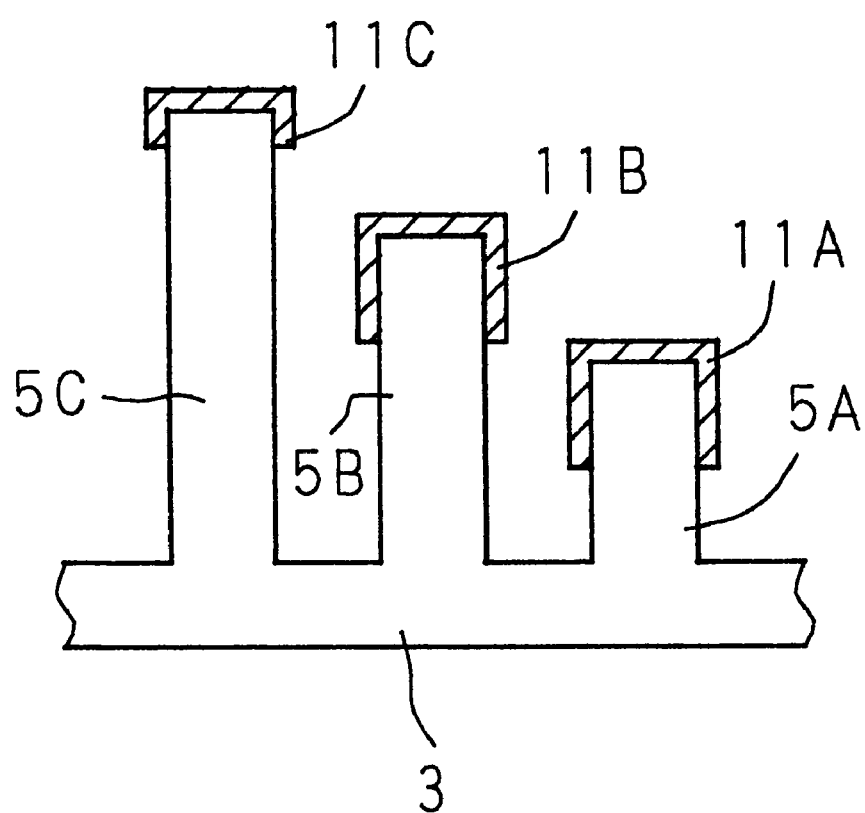

FIG. 16 is a plan view that shows an example in which capacitor $C_i$ is changed.

Figure 17:
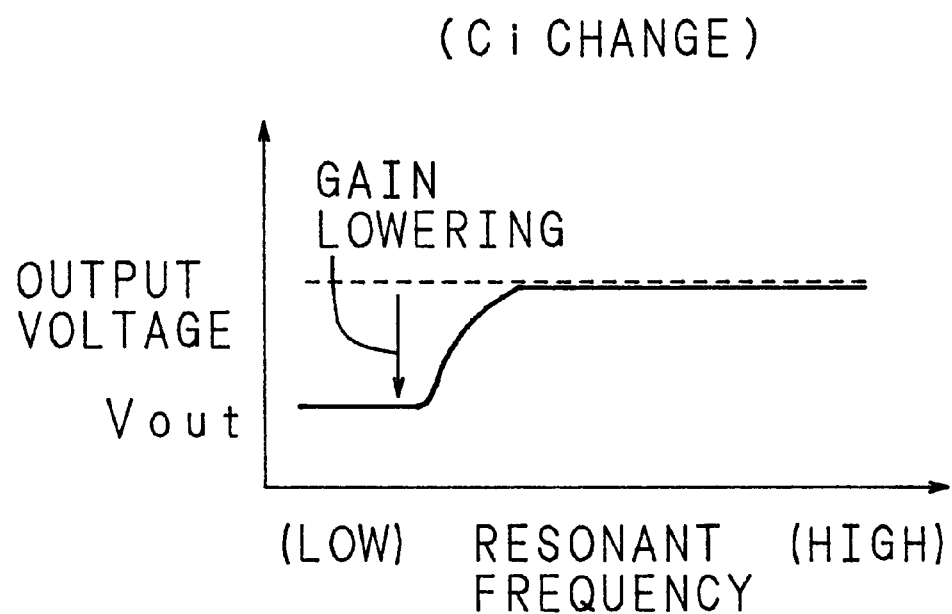

FIG. 17 is a graph that shows the relationship between the resonant frequency and the output voltage in the blase where capacitor $C_i$ is changed.

Figure 18A:
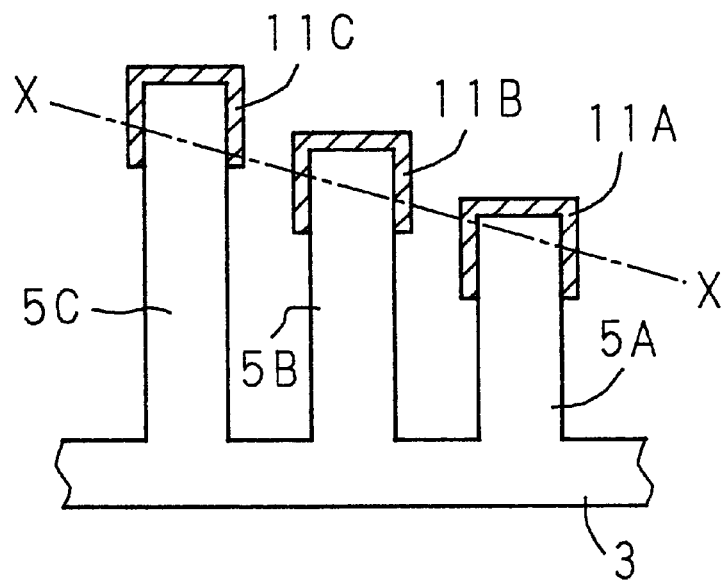
Figure 18B:
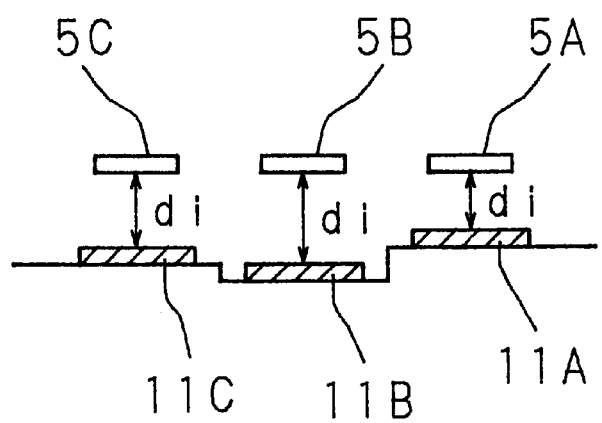

FIGS. 18A and 18B ate a plan view and a cross-sectional view that respectively show an example in which distance $d_i$ is changed.

Figure 19:
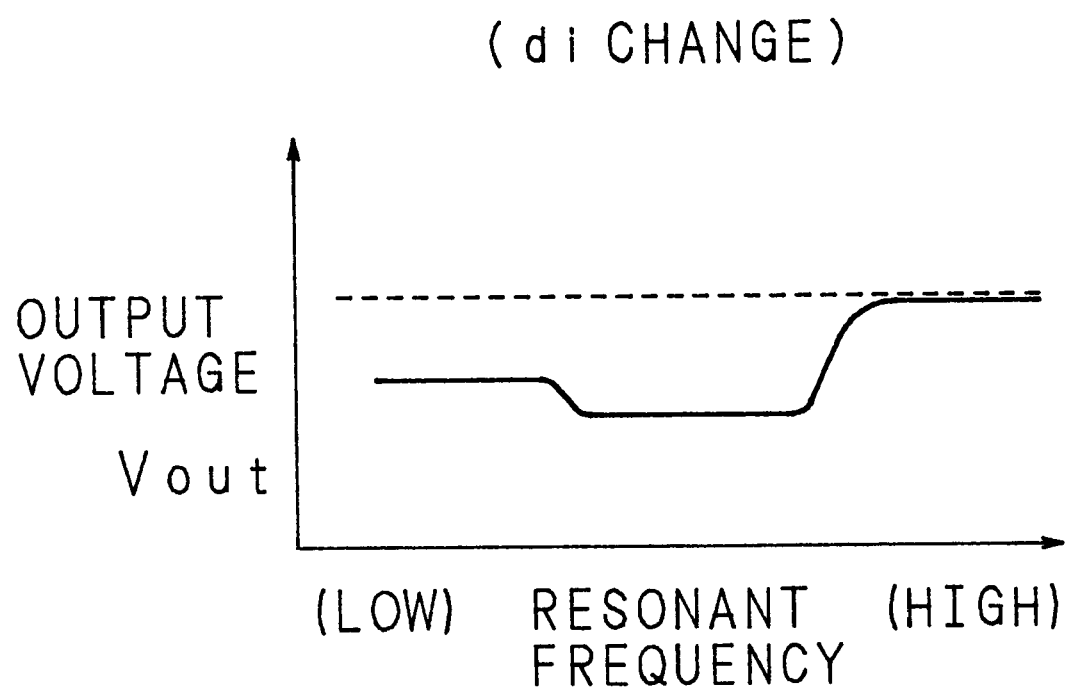

FIG. 19 is a graph that shows the relationship between the resonant frequency and the output voltage in the case where distance $d_i$ is changed.

Figure 20:
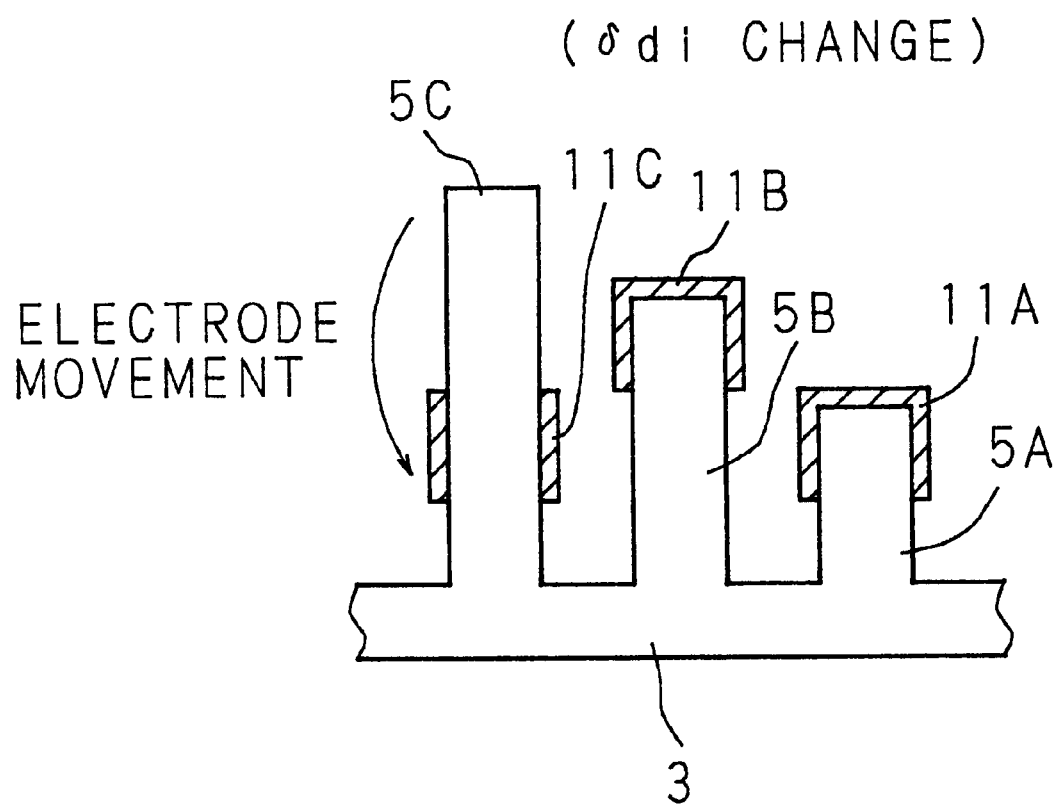

FIG. 20 is a plan view that shows an example in which minute change $\delta d_i$ in the distance is changed.

Figure 21:
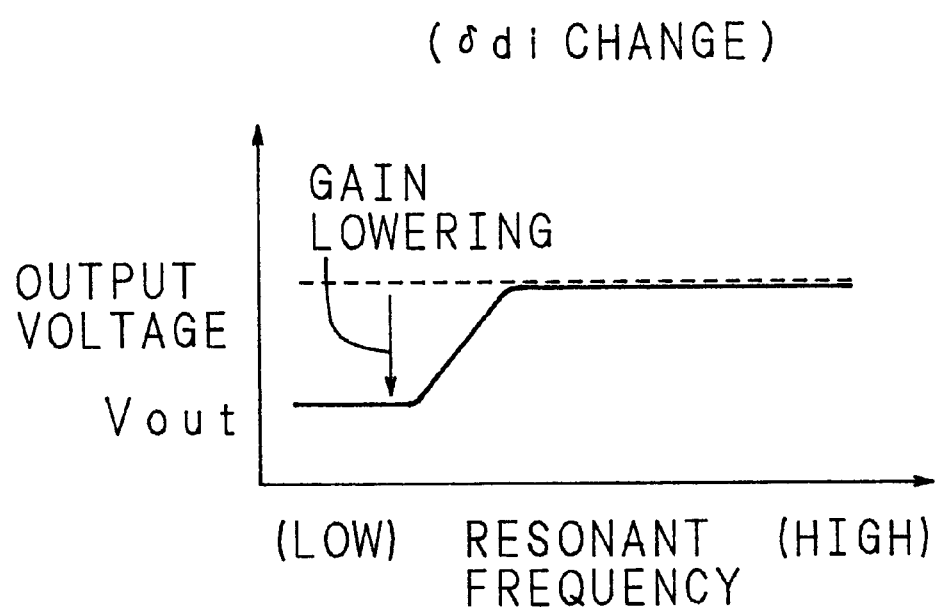

FIG. 21 is a graph that shows the relationship between the resonant frequency and the output voltage in the case where minute change $\delta d_i$ in the distance is changed.

DETAILED DESCRIPTION OF THE INVENTION

Referring co Figures, the following description will discuss embodiments of the present invention in detail. Here, an explanation will be given by exemplifying an acoustic sensor that uses a sound wave as a vibration wave to be detected.

(First Embodiment)

Figure 1:
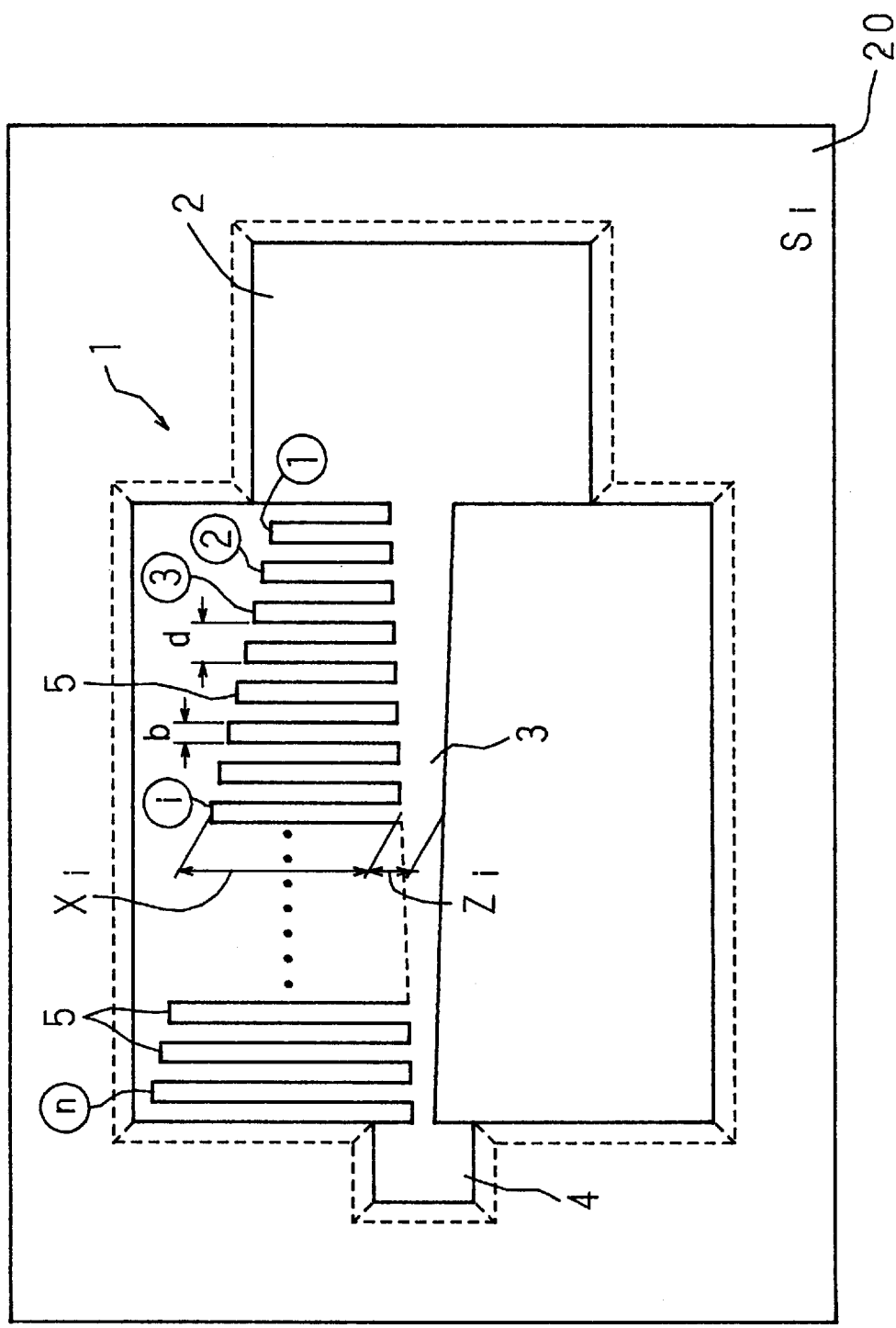
FIG. 1 is a plan view that shows one example of a sensor main body in a vibration wave detector of the present invention.

FIG. 1 is a plan view that shows one example of a sensor main body in a vibration wave detector of the present invention. The sensor main body 1, formed on a semiconductor silicon substrate 20. is constituted by a diaphragm 2 for receiving an inputted sound wave, a transversal beam 3 that is connected to the diaphragm 2, a terminator 4 connected to the tip of the transversal beam 3, and a plurality (n number) of resonator beams 5 each of which has one end supported by the transversal beam 3, and all of these parts are made of semiconductor silicon.

The width of the transversal beam 3 is widest at the end of the diaphragm 2, gradually narrowed toward the terminator 4 side, and becomes narrowest at the end of the terminator 4. Moreover, each resonator beam 5 is a resonator the length of which is adjusted so as to resonate at a specific frequency.

Each of these resonator beams 5 is allowed to selectively respond and vibrate at a resonant frequency f represented by the following equation (1):

$$f = (CaY^{1/2})/(X^2 s^{1/2}) \quad (1)$$

where C: a constant experimentally determined;
    a: the thickness of each resonator beam 5;
    X: the length of each resonator beam 5;
    Y: Young's modulus of the material substance (semiconductor silicon); and
    s: the density of the material substance (semiconductor silicon).

As can be seen from the above-mentioned equation (1) the resonant frequency f of each resonator beam 5 is set at a desired value by changing its thickness a or its length X; thus, each resonator beam 5 has an inherent resonant frequency. In the present embodiment, the thickness a of all the resonator beans 5 is constant, and the length X thereof is successively increased from the right side (the diaphragm 2 side) toward the left side (the terminator 4 side); therefore, the resonant frequency at which each resonant beam 5 inherently vibrates is high at the right side (the diaphragm 2 side) and is gradually reduced toward the left side (the terminator 4 side).

Table 1 shows one example of specific specifications of the sensor main body 1 including n number of resonator beams 5. Here, the thicknesses of the diaphragm 2, the transversal beam 3 and the terminator 4 are the same as the thickness (a) of the resonator beam 5.

TABLE 1

| Parameter | Value |
| --- | --- |
| Number of resonator beams 5 (n) | 29 |
| Thickess (a) | 10 $\mu$m |
| Length of resonator beam 5 (Xi) | 2450 $r^{i-29}$ $\mu$m |
| Width of resonator beam 5 (b) | 80 $\mu$m |
| Pitch of resonator beam 5 (d) | 120 $\mu$m |
| Width of transversal beam 3 (Zi) | 60 $r^{29-i}$ $\mu$m |

$r = 2^{1/48} = 1.0145$

In this case, the sensor main body 1 having the above-mentioned arrangement is formed on the semiconductor silicon substrate 20 by using a micromachining technique. In such an arrangement, when a sound wave is inputted to the plate shaped diaphragm 2, the diaphragm 2 is allowed to vibrate, and the vibrating wave representing the sound wave is transmitted to the transversal beam 3, and further transferred to the terminator 4 with the resonator beams 5, each of which has one end supported by the transversal beam 3, being successively allowed to resonate at their specific frequencies.

Figure 2:
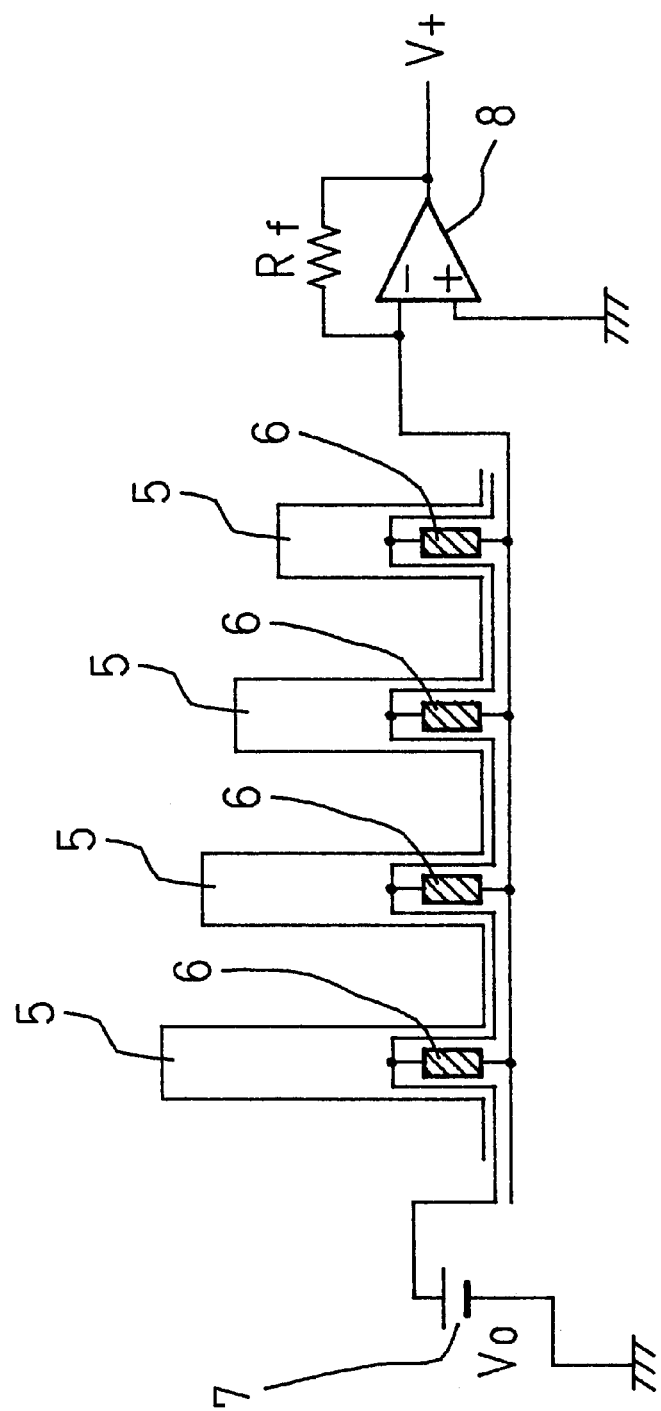
FIG. 2 is a circuit diagram that shows one example of the vibration wave detector of the present invention.

FIG. 2 shows a circuit diagram that shows a vibration wave detector of the present invention in which such a sensor main body 1 is used. A piezoresistor 6, made of polysilicon, is formed on a strain-generating section (on the transversal beam 3 side) of each resonator beam 5 of the sensor main body 1. These plural piezoresistors 6 are connected in parallel with one another, and one end of the parallel circuit is connected to a DC power supply 7 (voltage $V_0$), and the other end thereof is connected to the minus input terminal of an operational amplifier 8. The operational amplifier 8 has its plus input terminal connected to ground.

The DC power supply 7 commonly applies a bias voltage $V_0$ to all the resonant beams 5. When a specific resonator beam 5 is allowed to resonate, the resistance value of the corresponding piezoresistor 6 is changed due to a resulting strain, and the sum of these changes is obtained as an output from the operational amplifier 8.

(Second Embodiment)

Figure 3:
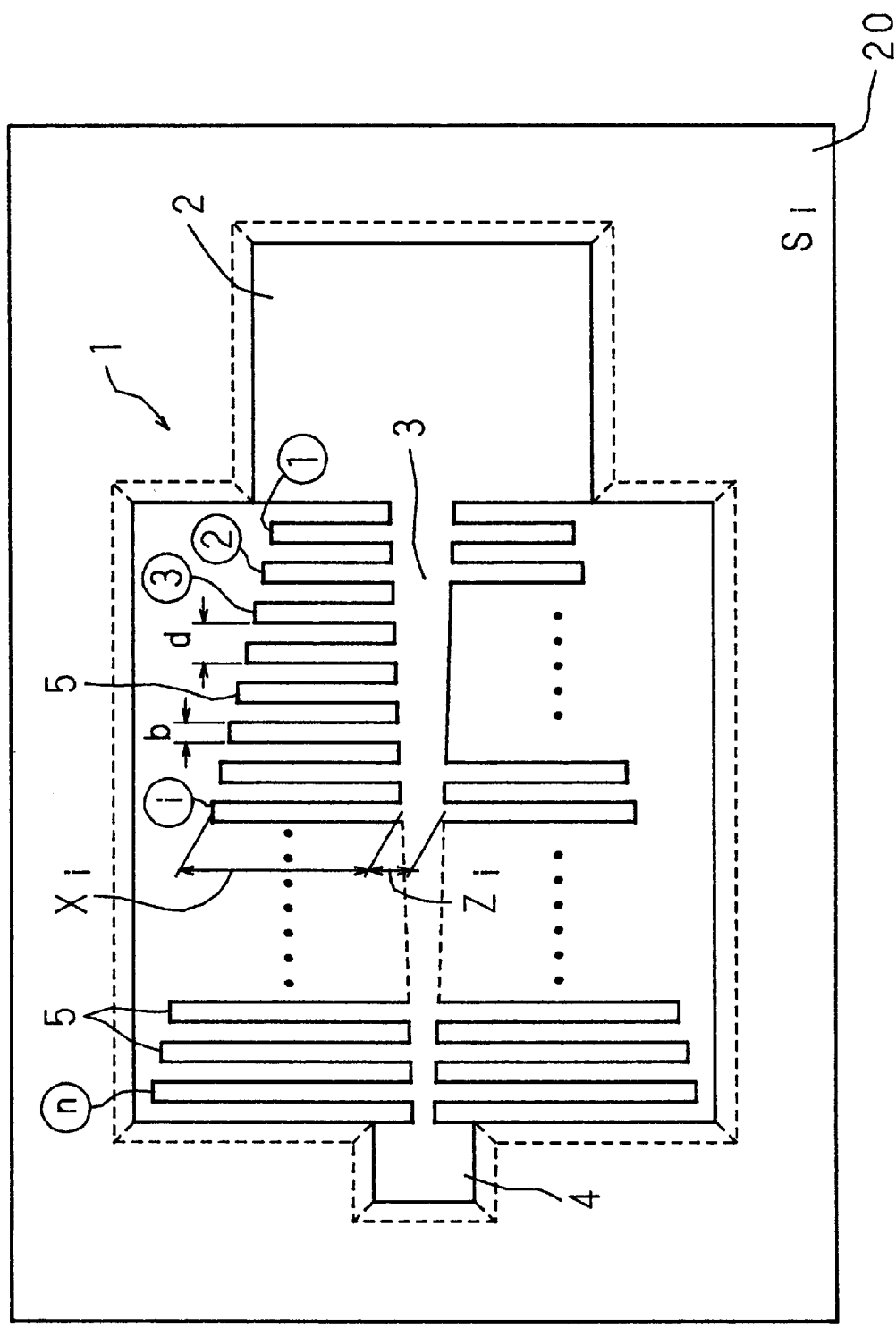
FIG. 3 is a plan view that shows another example of the sensor main body in the vibration wave detector of the present invention.

FIG. 3 is a plan view that shows another example of the sensor main body 1 in the vibration wave detector of the present invention. In the second embodiment, different from the first embodiment in which a plurality of resonator beams 5, the length of which is adjusted so as to resonate in response to a specific frequency, are placed only on one side of the transversal beam 3, n number of pairs of the resonator beams 5 having the same resonant frequency are placed on both sides of the transversal beam 3. In other words, each pair of the resonator beams 5, 5, which are connected to the same position of the transversal beam 3 in the length direction, have the same length and the same resonant frequency. The other members such as the diaphragm 2, the transversal beam 3 and the terminator 4 have the same arrangement as those of the first embodiment.

Moreover, in the second embodiment, except that the number of the resonator beams 6 is doubled (2n number, for example, 29×2=58), the actual specifications are also the same as those of the embodiment 1 (Table 1). That is, in the same manner as the embodiment 1, the thickness a of all the resonator beams 5 is constant, and the length X thereof is successively lengthened from the right side (the diaphragm 2 side) toward the left side (the terminator 4 side), with the result that the diaphragm 2 side forms a high-frequency side in the resonant frequency.

Figure 4:
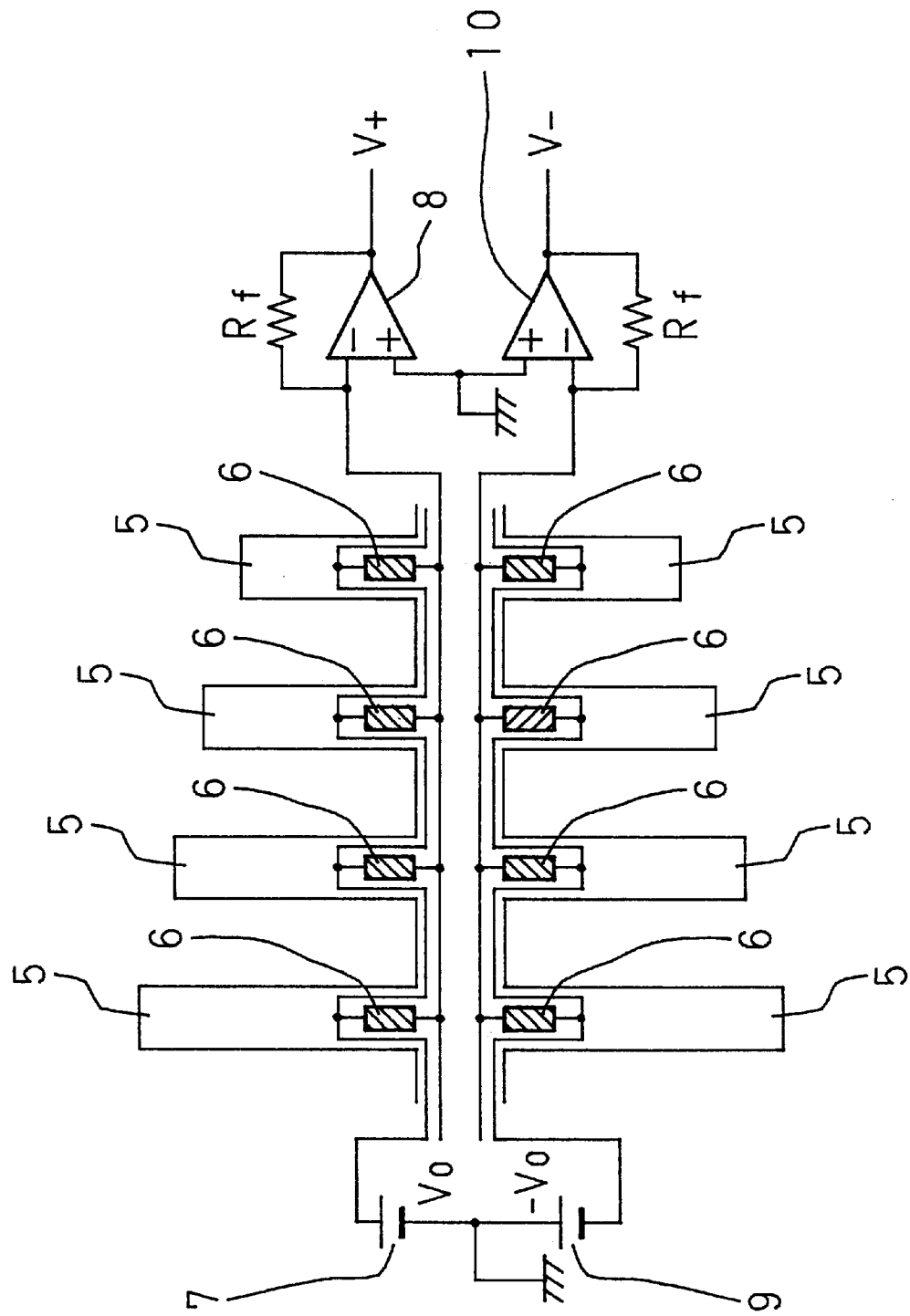
FIG. 4 is a circuit diagram that shows another example of the vibration wave detector of the present invention.

FIG. 4 is a circuit diagram that shows a vibration wave detector of the present invention in which such a sensor main body 1 is used. In FIG. 4, the same members as those of FIG. 2 are indicated by the same reference numerals. In this example, pairs of the resonator beams 5, 5, each pair having the same resonant frequency, are provided (that is, the fishbone structure); therefore, two pairs of parallel circuits to which the piezoresistors 6 are connected are provided, DC power supplies 7 and 9 for applying DC bias voltages $V_0$ and $-V_0$ to the respective parallel circuits are provided, and operational amplifiers 8 and 10 for getting output signals from the respective parallel circuits are provided, Thus, twice as much output is obtained by adding the output signals from the two parallel circuits. Moreover, even in the event of any abnormality in one resonator beam 5 failing to provide its electric output signal, although the arrangement shown in FIG. 2 would cause a detection error, the arrangement shown in FIG. 4 makes it possible to provide an output signal having a corresponding frequency component by using the other resonator beam 5 paired by the resonator beam 5 having the abnormality, and consequently to prevent the detection error.

Here, the reasons that the piezoresistors 6 are used as a method for converting a mechanical vibration into an electric signal are because they are easily manufactured because they have a linear conversion characteristic and because they have a high conversion efficiency.

Next, an explanation will be given of the operation. When a sound wave is inputted to the diaphragm 2 of the sensor main body 1 shown in FIG. 1 or FIG. 3, the plate-shaped diaphragm 2 is allowed to vibrate, and the energy of the vibrating wave representative of the sound wave is transmitted to each of the resonator beams 5 through the transversal beam 3, and successively absorbed by them from the high-frequency side toward the low-frequency side.

Figure 5:
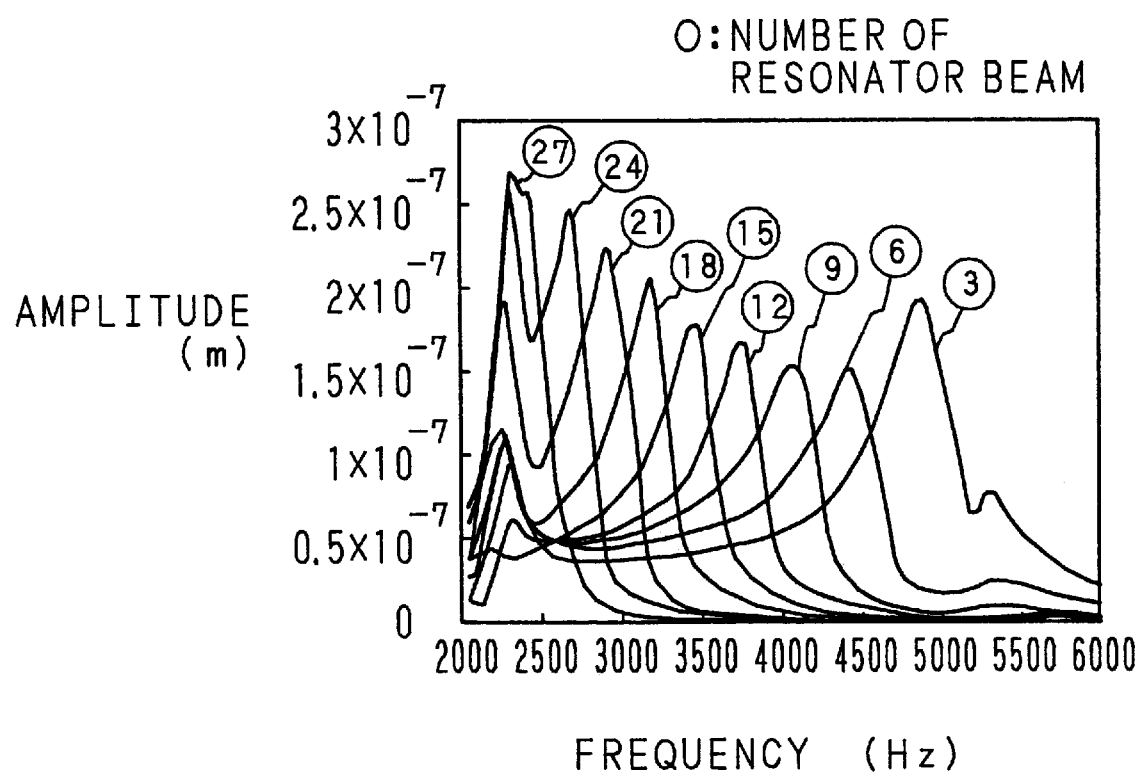
FIG. 5 is a graph that shows the results of simulation in the resonant beam frequency response of an FEM analysis in the vibration wave detector of the present invention.

FIG. 5 is a graph that shows the results of an FEM analysis in which the amplitude at the tip of each resonator beam 5 is simulated when a sound wave of 0.1 Pa is inputted to the diaphragm 2. The resonator beams 5 in the graph are successively numbered from the diaphragm 2 side. As can be seen from the graph, it is confirmed that the sensor main body 1 of the present invention has a superior frequency selectivity.

When such a resonance occurs in each resonator bean 5, the resistance value of the piezoresistor 6 formed in each resonator beam 5 is changed due to the strain. A constant bias voltage $V_0$ is applied to the respective parallel-connected piezoresistors 6 so that the changes in the resistance value of the piezoresistors 6, caused by the strain in each resonator beam 5, are added as electric currents flowing through one signal line.

In FIG. 4, the current I flowing through an imaginary ground in the operational amplifier 8 is represented by the following equation (2):

$$I = \sum_{i=1}^{n} \frac{V_0}{R_i + \delta R_i} \simeq \sum_{i=1}^{n} \frac{V_0}{R_i} - \sum_{i=1}^{n} \left(\frac{V_0}{R_i}\right)\left(\frac{\delta R_i}{R_i}\right) \quad (2)$$

where $R_i$: a constant term of the resistance of i-numbered resonator beam 5; and $\delta R_i$: a vibration term caused by a mechanical vibration on the i-numbered resonator beam 5.

Moreover, the output voltage $V_o$ of the operational amplifier 8 is represented by the following equation (3). In equation (3), the second term represents a variant voltage caused by a vibration.

$$V_+ = -\sum_{i=1}^{n} \frac{R_f V_0}{R_i} + \sum_{i=1}^{n} \left(\frac{R_f V_0}{R_i}\right)\left(\frac{\delta R_i}{R_i}\right) \quad (3)$$

where $R_f$: feedback resistance.

Supposing that the strain of each piezoresistor 6 is constant with respect to all the resonator beams 5, and that this value is $\epsilon_i$, the ratio of a change in the resistance caused by the vibration is represented by equation (4), and the contribution ratio to the output voltage is represented by equation (5). Therefore, the variant voltage $v_+$ caused by the vibration represented by the second term of equation (3) is indicated by equation (6).

$$\frac{\delta R_i}{R_i} = \pi E \epsilon_i \quad (4)$$

$$\frac{R_f V_0}{R_i} = \frac{R_f h V_0}{\rho} \frac{W_i}{L_i} \quad (5)$$

$$v_+ = \sum_{i=1}^{n} \frac{\delta R_i}{R_i} \frac{R_f V_0}{R_i} \simeq \sum_{i=1}^{n} \pi E \epsilon_i \frac{h R_f V_0}{\rho} \frac{W_i}{L_i} \quad (6)$$

Therefore, equations (5) and (6) show that the contribution ratio and the variant voltage can be controlled independently by the shape ($W_i/L_i$) of the piezoresistor 6 in each resonator beam 5, and can also be controlled in a constant manner by the bias voltage $V_0$ with respect to all the resonator beams 5.

Figure 6:
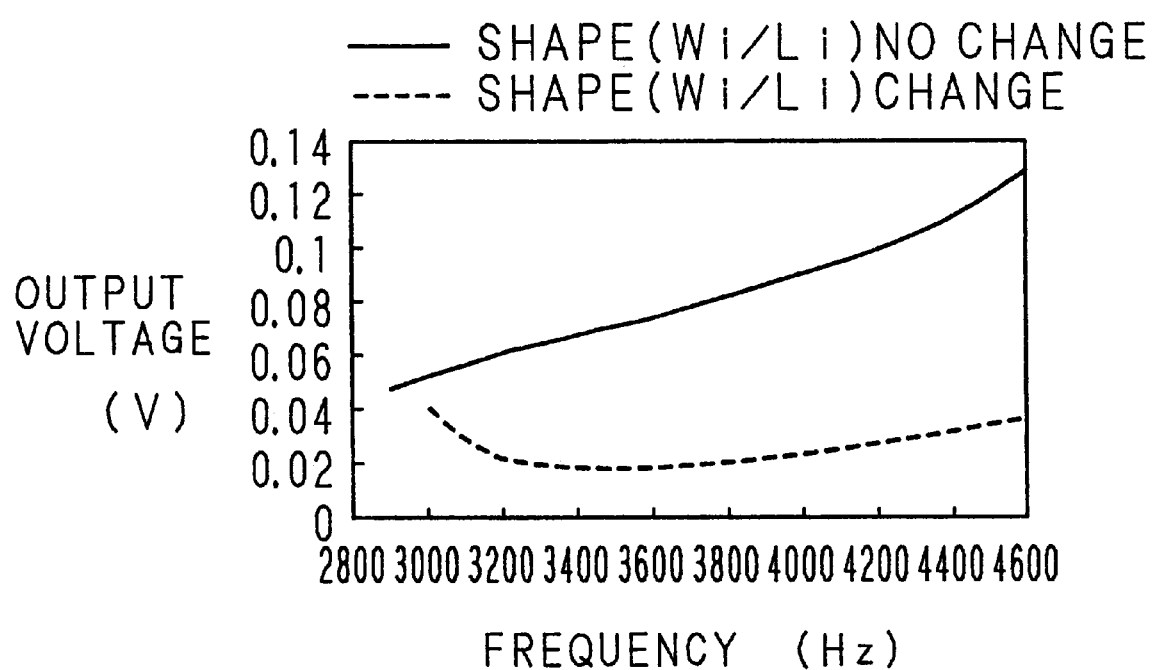
FIG. 6 is a graph that shows the results of simulation on the relationship between the output voltage and the frequency of the vibration wave detector of the present invention.

As described above, since the gain of the variant voltage is dependent on the shape of the piezoresistor 6, it is possible to adjust the output gain for each of the resonator beams 5 by changing the shape of the piezoresistor 6 formed in the resonator beam 5, that is, by changing the resistance value of the piezoresistor 6, In the arrangement of FIG. 4, a simulation was carried out under the conditions of $V_0$=5 V, $R_i$=4 kΩ, $\rho$=8.0×10$^{-5}$ Ωm, $L_i$=200 μm, $W_i$=20 μm, $R_f$=1 MΩ and $\pi$E=100, and the voltage amplitude of $\epsilon_i$ was calculated by the FEM analysis. At this time, all the piezoresistors 6 formed in the resonator beams 5 were set to have the same shape. FIG. 6 shows the results in a solid line. It is understood that; the frequency response is not flat.

Here, in order to obtain a flat frequency response, after the shape ($W_i/L_i$) of the piezoresistor 6 formed in each resonator beam 5 had been changed so as to adjust the output gain of each resonator beam 5, a simulation was carried out under the same conditions, and the voltage amplitude of $\epsilon_i$ was calculated by the FEM analysis. FIG. 6 shows the results in a broken line. It is understood that a flat frequency response is obtained. In this manner, it is possible to easily control the output gain of each resonator beam 5 by changing the shape ($W_i/L_i$) of the piezoresistor 6.

Figure 7A:
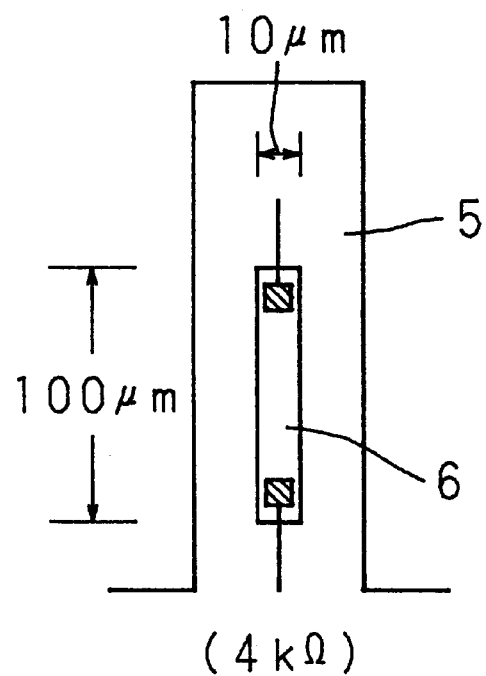
Figure 7B:
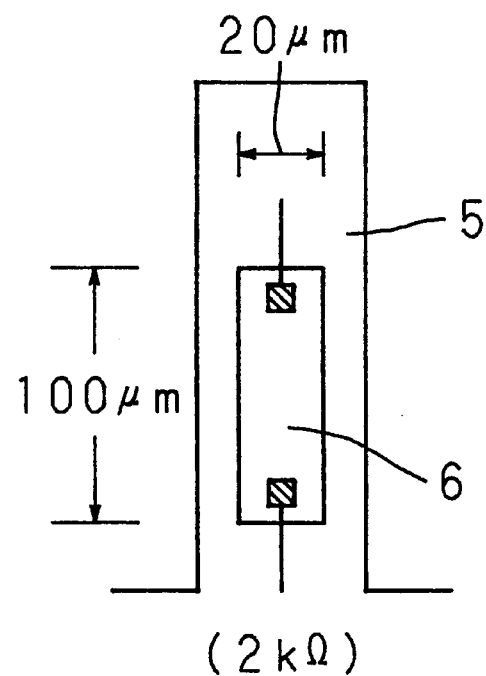

The following description will discuss some specific examples in which the resistance value of the piezoresistor 6 was changed. FIGS. 7A and 7B are drawings that show one example of the change in the resistance value, in which the piezoresistor 6 (FIG. 7A) having a width $W_i=10$ µm and a length $L_i=100$ µm, formed in the resonator beam 5, was changed to a piezoresistor 6 (FIG. 7B) having a width $W_i=20$ µm and a length $L_i=100$ µm. In this manner, by changing the width $W_i$ of the rectangular piezoresistor 6, it is possible to change the resistance value from 4 kΩ to 2 kΩ.

Figure 8A:
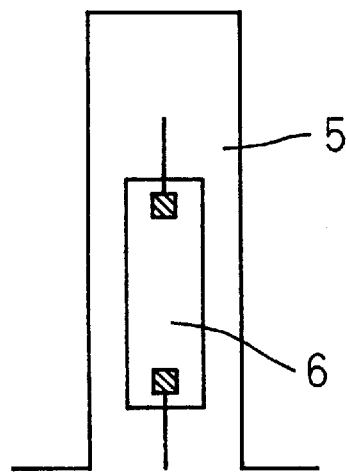
Figure 8B:
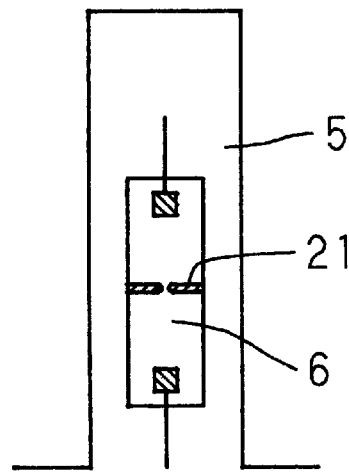
Figure 8C:
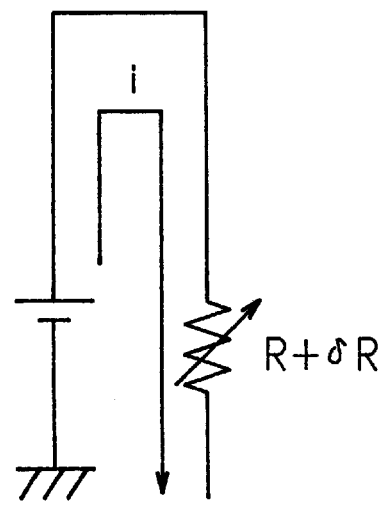
Figure 8D:
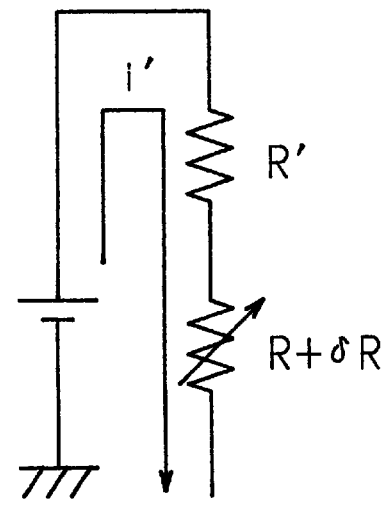

FIGS. 8A through 8D are drawings that show another example of the change in the resistance value. A slit 21 (FIG. 8B) is formed in a direction orthogonal to the direction of strain by using, for example, laser trimmings in one portion of the rectangular piezoresistor 6 (FIG. 8A) formed in each resonator beam 5. FIG. 8C shows an equivalent electric circuit prior to the formation of the slit 21, and FIG. 8D shows an equivalent electric circuit after the formation of the slit 21 The resistance R' at the bottleneck portion formed by the slit 21 is apparently connected in series with the resistance R+δR so that the resistance value as a whole is changed. Since the value of resistance R' can be adjusted by the length of the slit 21. and since the slit width is so small that the value of resistance R+δR is regarded as constant independent of the formation of the slit 21, it is possible to control the output gain of the resonator beam 5 by using the value of resistance R', that is, depending on how the slit 21 is formed.

FIG. 9 is a drawing that shows still another example of the change in the resistance value. Different from the aforementioned example, two slits 21. 21 are formed so that the direction of a current flowing through the bottleneck portion is made orthogonal to the direction of strain. In this case, the bottleneck portion through which the current flows in the direction orthogonal to the direction of strain has no change in its specific resistivity due to the strain. In the present embodiment, the bottleneck portion, which forms an additional resistor, can be changed in both its length and width depending on how the slits 21, 21 are formed; therefore, it becomes possible to provide a greater degree of freedom in adjusting the value of resistance R' as compared with the aforementioned example. In the aforementioned example, only the width of the bottleneck portion forms a parameter of the value of resistance R', and the width needs to be extremely narrowed so as to increase the value, resulting in a greater limitation to the machining process. In contrast, in the present example, since the length and width of the bottleneck portion form the parameters of the value of resistance R', it is possible to widen the control range of the output gain in the resonator beam 5.

Additionally, the slit 21 as shown in FIG. 8B and FIG. 9 may be formed by using a photolithography technique during the manufacturing process of the sensor, or may be formed by using laser trimming or focused ion-beam irradiation after the manufacturing process of the sensor. In either case, the gain adjustment can be carried out by applying laser trimming or focused ion-beam irradiation to the manufactured sensor.

As described earlier, the contribution ratio and the variant voltage are controlled by a bias voltage $V_0$ to be applied to the piezoresistor 6 of each resonator beam 5 based upon equations (5) and (6). In this manner, since the gain of the variant voltage is dependent on the bias voltage $V_0$ to the piezoresistor 6, the output gain can be adjusted for each resonator beam 5 by changing the bias voltage $V_0$.

FIG. 10 is a circuit diagram that shows one example of a vibration wave detector of the present invention in which the bias voltage to the piezoresistor 6 in each resonator bean 5 is changed. In FIG. 10, the same members as those of FIG. 4 are indicated by the same reference numerals. In this example, one end of the piezoresistor 6 of each resonator beam 5 is connected to an independent power supply so that a bias voltage having a different magnitude is applied to each of the piezoresistors 6.

More specifically, in the example of FIG. 10, piezoresistors 6A, 6B and 6C, formed in three resonator beams 5A, 5B and 5C respectively, have their one end connected to respectively independent DC power supplies 7A, 7B and 7C (9A, 9B and 9C), and have their other end formed into a common output terminal; thus, different bias voltages $V_A$ ($-V_A$), $V_B$ ($-V_B$) and $V_C$ ($-V_C$) are applied to the respective piezoresistors 6A, 6B and 6C. Here, the magnitudes of the bias voltages to be applied to the respective piezoresistors 6A, 6B and 6C are determined in accordance with gains that are desirably set in the respective resonator beams 5A, 5B and 5C.

In this manner, since the magnitude of the bias voltage to the piezoresistor 6 in each resonator beam 5 can be changed, it becomes possible to freely set the gain for each resonant frequency of each resonator beam 5.

FIG. 11 is a circuit diagram that shows still another example of a vibration wave detector in which a bias voltage to the piezoresistor 6 in each resonator beam 5 is changed. In FIG. 11, the same members as those of FIG. 4 are indicated by the same reference numerals. In this examples all the resonator beams 5 are divided into a plurality of blocks, each having a specific frequency band that is to be set at the same desired gain, and in each block, the piezoresistors 6 in the respective resonator beams 5 are connected in parallel with one another, and one end of each parallel circuit is connected to an independent power supply corresponding to the desired gain to be set so that bias voltages having the same magnitude are applied to the piezoresistors 6 included in the same block.

More specifically. in the example shown in FIG. 11, four resonator beams 5 are divided into two blocks, that is, one block on the high resonant frequency side including two resonator beams 5a and 5b and another block on the low resonant frequency side including two resonator beams 5c and 5d. Then, in the respective two blocks, the piezoresistors 6a and 6b are connected and the piezoresistors 6c and 6d and 6d are connected. One end of each parallel circuit is connected to respectively independent DC power supplies 7a and 7c (9a and 9c), and the other ends are formed into a common output terminal. A bias voltage $V_a$ ($-V_a$) is applied from the DC power supply 7a (9a) to the piezoresistors 6a and 6b on the high frequency side, and a bias voltage $V_c$ ($-V_c$) is applied from the DC power supply 7c (9c) to the piezoresistors 6c and 6d on the low frequency side. Here, the magnitudes of the bias voltages $V_a$ ($-V_a$) and $V_c$ ($-V_c$) to be applied to the respective parallel circuits are determined for each block (for each frequency band) in accordance with the desired gain to be set.

In this manner, since the bias voltage to the piezoresistor 6 in the resonator beam 5 can be changed for each frequency band, it is possible to freely set the gain of the resonator beam 5 for each frequency band.

The following description will discuss the results of simulation in the case described above. In a sensor main body 1 having a transversal beam 2 on both sides of which two pairs of the resonator beams 5, each pair having 29 resonator beams, are formed, the resonator beams 5 of the two pairs, each consisting of 25 resonator beams 5 except the respective two located at the ends, are divided into 8 blocks for each of predetermined frequency bands. As shown in FIG. 12, a bias voltage of 5 V is applied to the four blocks on the low-frequency side (the resonator beams 5 from the 27th to 16th: the resonant frequency of the 16th resonator beam 5 is 3400 Hz). and a bias voltage of 0 V is applied to the four blocks (the resonator beams 5 from the 3rd to 15th) on the high-frequency side.

FIG. 13 shows the results of a simulation carried out on the frequency and the amplitude of the variant voltage in this state. The magnitude of the variant voltage decreases with 3400 Hz being a turning point; this confirms that a frequency response applicable as an LPF (Low-Pass Filter) has been achieved.

Additionally, a bias voltage that varies with time may be applied to the vibration sensors of the first and second embodiments. For example, in a preferable embodiment in which an AC voltage is used as the bias voltage, it becomes possible to obtain a signal in which the amplitude of the vibration is modulated.

In the above-mentioned first and second embodiments, explanations were given of cases in which strains caused by the resonance of the respective resonator beams are detected by piezo-elements (piezoresistors). In the following embodiment, an explanation will be given of a capacitance system in which the strains are detected by capacitive elements.

(Third Embodiment)

FIG. 14 is a perspective view that shows the third embodiment of the vibration wave detector of the present invention. The arrangement of the sensor main body 1 shown in FIG. 14 is substantially the same as that of the first embodiment; therefore, the same members are indicated by the same reference numerals and the description thereof is omitted.

Electrodes 11 are formed on the semiconductor silicon substrate 20 at positions facing the tips of the respective resonator beams 5 so that a capacitor is formed by the tip of each resonator beam 5 and each electrode 11 facing it. The tip of each resonator beam 5 is a movable electrode the is position of which is raised and lowered in response to the vibration, while the electrode 11 formed on the semiconductor silicon substrate 20 is a fixed electrode the position of which is not allowed to move. Here, when the resonator beam 5 vibrates at a specific frequency, the distance between the two electrodes varies, with the result that the capacity of the capacitor is changed.

FIG. 15 is a circuit diagram that explains the third embodiment. A plurality of electrodes 11 are connected in parallel with one another, and one end of the parallel circuit is connected to a DC power supply 12 (voltage $V_0$). The transversal beam 3 is connected to the minus input terminal of an operational amplifier 13. The plus input terminal of the operational amplifier 13 is connected to ground. The voltage $V_0$ is commonly applied to all the electrodes 11 by the DC power supply 12. When a specific resonator beam 5 is allowed to resonate, the strain causes a change in the distance between the tip of the resonator beam 5 and the electrode 11 so that the capacity of the capacitor between them is changed; thus, the sum of these changes is obtained as an output (voltage $V_{out}$) of the operational amplifier 13.

In FIG. 1, a current I' that flows into an imaginary ground of the operational amplifier 13 is represented by equation (7).

$$I' = \frac{d(\delta C V_0)}{dt}$$

$$= \frac{d}{dt} \sum_{i=1}^{n} \left( \frac{C_i V_0}{d_i} \right) \delta d_i$$

$$= \sum_{i=1}^{n} \left( \frac{C_i V_0}{d_i} \right) \left( \frac{d}{dt} \delta d_i \right)$$

(7)

where $d_i$: the distance between the i-numbered resonator beam 5 and the corresponding electrode 11;
$\delta d_i$: a minute change in the distance $d_i$ in response to a vibration;
$C_i$: a capacity in a stationary state between the i-numbered resonator beam 5 and the corresponding electrode 11;
$\delta C_i$: a minute change in the capacity $C_i$ in response to the vibration;
C: a capacity between the entire sensor main body 1 and the electrodes 11; and
$\delta C$: a minute change in the capacity C in response to the vibration (more specifically, represented by equation (8)).

$$\delta C = \sum_{i=1}^{n} \delta C_i \simeq \sum_{i=1}^{n} \left( \frac{C_i}{d_i} \right) \delta d_i$$

(8)

When a feedback is given as a capacitor, the output voltage $V_{out}$ of the operational amplifier 13 is given by equation (9), and the strain in each resonator beam 5 is taken out as a voltage.

$$V_{out} = -\frac{1}{C_f} \int I' dt$$

$$= -\sum_{i=1}^{n} \left( \frac{C_i V_0}{C_f d_i} \right) \delta d_i$$

(9)

where $C_f$: a feedback capacity.

In other words, as shown in the above-mentioned equation (9), resonance of the respective resonator beams 5 is outputted as the sum of variations. In contrast, when a feedback is given as a resistor, resonance of the respective resonator beams 5 is outputted as the sum of velocities.

It is understood from the above-mentioned equation (9) that in order to adjust the gain for each resonator beam 5 (each frequency band), any of the capacitor $C_i$ the distance $d_i$ and the minute change $\delta d_i$ in the distance may be changed. The following description will discuss examples for adjusting the gain of each resonator beam 5 by changing the respective parameters.

FIG. 16 is a plan view that shows an example in which the capacitor $C_i$ is changed, and the area of an electrode 11C that corresponds to the longest resonator beam 5C among the three resonator beams 5A, 5B and 5C is made smaller than the area of each of electrodes 11A and 11B that relate to the other two resonator beams 5A and 5B. FIG. 17 shows the relationship between the resonant frequency and the output voltage $V_{out}$ in the above-mentioned case. Thus, the gain in the low-frequency area can be selectively made lower than the gains in the other frequency areas.

Moreover, FIG. 18A is a plan view that shows an example in which the distance $d_i$ is changed, and FIG. 18B is a cross-sectional view taken along line X—X of FIG. 18A. The distance between the shortest resonator beam 5A among the three resonator beams 5A, 5B and 5C and the corresponding electrode 11A is made shortest, and the distance between the resonator beam 5B having an intermediate length and the corresponding electrode 11B is made longest. FIG. 19 shows the relationship between the resonant frequency and the output voltage $V_{out}$ in the above-mentioned case. Thus, the gain in the high-frequency area can be made highest, and the gain in the intermediate-frequency area can be made lowest. In this case, as can be seen from the above-mentioned equation (9), since the output voltage $V_{out}$ varies with the square of the distance $d_i$, a wider width of the gain adjustment can be obtained when the distance $d_i$ is changed as described in the present embodiment.

Furthermore, FIG. 20 is a plan view that shows an example in which the minute change $\delta d_i$ of the distance is changed, Here, electrodes 11A and 11B corresponding to the, two of the resonator beams 5A and 5B among the three resonator beams 5A, 5B and 5C are formed so as to face the tips of the resonator beams 5A and 5B, while an electrode 11C corresponding to the longest resonator beam 5C is formed so as to face the base end of the resonator beam 5C. With the formation of the electrode 11C at this position, even if a vibration having the same magnitude is generated in the resonator beam 5C. the minute change $\delta d_i$ becomes smaller as compared with the case in which the electrode 11C is formed so as to face the tip of the resonator beam 5C. FIG. 21 shows the relationship between the resonant frequency and the output voltage $V_{out}$ in the above-mentioned case. Thus, the gain in the low-frequency area can be selectively made lower than those in the other frequency areas.

Additionally, it is also possible to apply a bias voltage that varies with time to the vibration sensors of the third embodiment For example, in a preferable embodiment in which an AC voltage is used as the bias voltages it is possible to obtain a signal in which the amplitude of vibration is modulated.

Furthermore, as in the case of the above-mentioned second embodiment, even in the vibration wave detector using this capacitance system, the arrangement in which n number of pairs of the resonator beams 5, each pair having the same resonant frequency, are formed on both sides of the transversal beam 3 may of course be adopted, with the same effect that the gain adjustment of each resonator beam 5 can be carried out by changing the capacitor $C_i$, the distance $d_i$ and the minute change $\delta d_i$ in the distance.

In the present invention, the gain of the electric output is controlled by making the conditions (the area, shape, installation position, etc.) of the detector (the piezoresistors 6 and the electrodes 11) variable; however, these conditions may be respectively set for each resonator beam 5 at the time of installing the detector during the manufacturing process of the vibration wave detector, or the condition setting may be changed after the detector has been installed.

Additionally, in the present invention, an explanation was given by exemplifying an acoustic sensor that is responsive to a sound wave as the vibration wave; however, the same arrangement may of course be applied to vibration waves other than the sound wave so as to adjust the gain of the output.

As described above, in the present invention, a plurality of resonators having respectively different resonant frequencies are formed into an array, and in response to an inputted vibration wave, each resonator is allowed to respond selectively with its resonant frequency so that upon detecting the intensity of each frequency component of the vibration wave, the detection gain in each resonator can be adjusted; thus, it becomes possible to realize a vibration wave sensor by which a desired frequency characteristic is obtained.

As this invention may be embodied in several forms without departing from the spirit of essential characteristics thereof, the present embodiment is therefore illustrative and not restrictive since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A vibration wave detecting method comprising:
    transmitting a vibration wave to be detected through a plurality of resonators, each having a different resonant frequency and being provided with a detector; and
    detecting an electric output generated by resonance of said each resonator at the resonant frequency by adjusting a gain of said electric output.

2. The vibration wave detecting method according to claim 1, wherein the gain of said electric output of each resonator is adjusted by using said each detector whose area can be changed.

3. The vibration wave detecting method according to claim 2, wherein said each detector has its area set so as to make gains of the electric outputs of said resonators equal to each other.

4. The vibration wave detecting method according to claim 2, wherein the said area of at least one of said detectors is reduced.

5. The vibration wave detecting method according to claim 1, further comprising:
    connecting said detectors in parallel;
    applying a voltage to one end of said parallel-connected circuit; and
    getting a sum of electric outputs of said detectors from the other end of said parallel-connected circuit.

6. The vibration wave detecting method according to claim 1, wherein said detector is one element selected from the group consisting of a strain detecting element, a capacitive element and a piezoresistor element.

7. The vibration wave detecting method according to claim 1, further comprising:
    installing a piezoresistor in each of said resonators; and
    detecting an electric output generated by resonance of said resonator at the resonant frequency by adjusting a gain of said electric output by changing a resistance value of said piezoresistor.

8. The vibration wave detecting method according to claim 1, wherein said detection is made by adjusting a gain of said electric output generated by resonance of said resonator at the resonant frequency by changing a voltage to be applied to said each detector.

9. The vibration wave detecting method according to claim 5, wherein said voltage to be applied is an AC voltage.

10. The vibration wave detecting method according to claim 8, wherein said voltage to be applied is an AC voltage.

11. A vibration wave detector comprising:
    a plurality of resonators, each resonating at each different specific frequency; and
    a plurality of detectors, each detecting an electric output generated by resonance of each resonator at said frequency due to a vibration wave to be detected that has bees transmitted to each resonator, wherein said each detector is an electric-output variable gain detector in each resonator.

12. The vibration wave detector according to claim 11, wherein a gain of each detector is substantially equal to each other.

13. The vibration wave detector according to claim 11, wherein an area of each defector is variable.

14. The vibration wave detector according to claim 11, further comprising:

a parallel circuit in which said detectors are parallel connected;

a voltage source connected to said parallel circuit; and an output circuit for getting a sum of electric outputs of said parallel circuit.

15. The vibration wave detector according to claim 11, wherein said each detector is a strain detecting element.

16. The vibration wave detector according to claim 11, wherein said each detector is a capacitive element.

17. The vibration wave detector according to claim 11, wherein said each detector is a piezoresistor.

18. The vibration wave detector according to claim 17, therein a resistance value of said piezoresistor is variable.

19. The vibration wave detector according to claim 18, wherein a shape of said piezoresistor is variable.

20. The vibration wave detector according to claim 18, wherein said piezoresistor has a slit formed therein.

21. The vibration wave detector according to claim 17, wherein said piezoresistor is formed so that a current flowing through a bottleneck portion thereof has a direction substantially orthogonal to a direction of strain.

22. The vibration wave detector according to claim 11, wherein said resonators are divided into blocks, each block having a plurality of resonators as a unit, with each parallel circuit being formed by parallel-connecting said detectors for each block, further comprising:

a circuit for applying a different voltage to said detectors or reach parallel circuit of each block.

23. The vibration wave detector according to claim 22, further comprising:

a circuit for getting a sum of electric outputs of said respective blocks.

24. The vibration wave detector according to claim 14, wherein said voltage source is an AC voltage source.

25. The vibration wave detector according to claim 22, wherein said voltage to be applied is an AC voltage.

26. A vibration wave detector comprising:

a vibration-wave input section for receiving a vibration wave to be detected;

a plurality of resonators each of which resonates at a different specific frequency;

a transmitting section for transmitting the vibration wave received by said vibration-wave input section to said resonators;

a plurality of detectors each of which detects an electric output generated by resonance of each resonator at said frequency due to the vibration wave that has been transmitted to each resonator; and an adjusting device for adjusting a gain of an electric output of each resonator by adjusting a voltage to be applied to each detector.

27. A vibration wave detector comprising:

a plurality of resonators, each resonating at the same specific frequency; and a plurality of detectors, each detecting an electric output generated by resonance of each resonator at said frequency due to a vibration wave to be detected that has been transmitted to each resonator, wherein said each detector is an electric-output variable gain detector in each resonator.

* * * * *